Sept. 5, 1939.    J. J. BAUMAN    2,171,517
REFRIGERATING APPARATUS
Filed April 30, 1937    2 Sheets-Sheet 1

INVENTOR.
BY J. J. Bauman
ATTORNEY.

Sept. 5, 1939.  J. J. BAUMAN  2,171,517
REFRIGERATING APPARATUS
Filed April 30, 1937   2 Sheets-Sheet 2
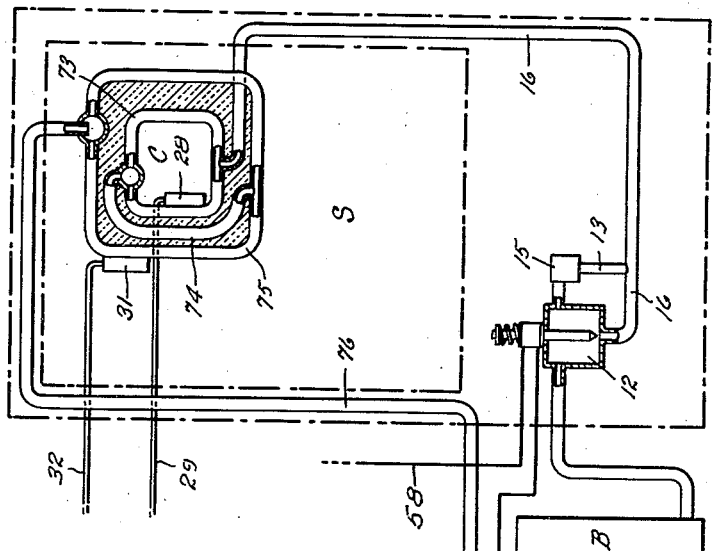
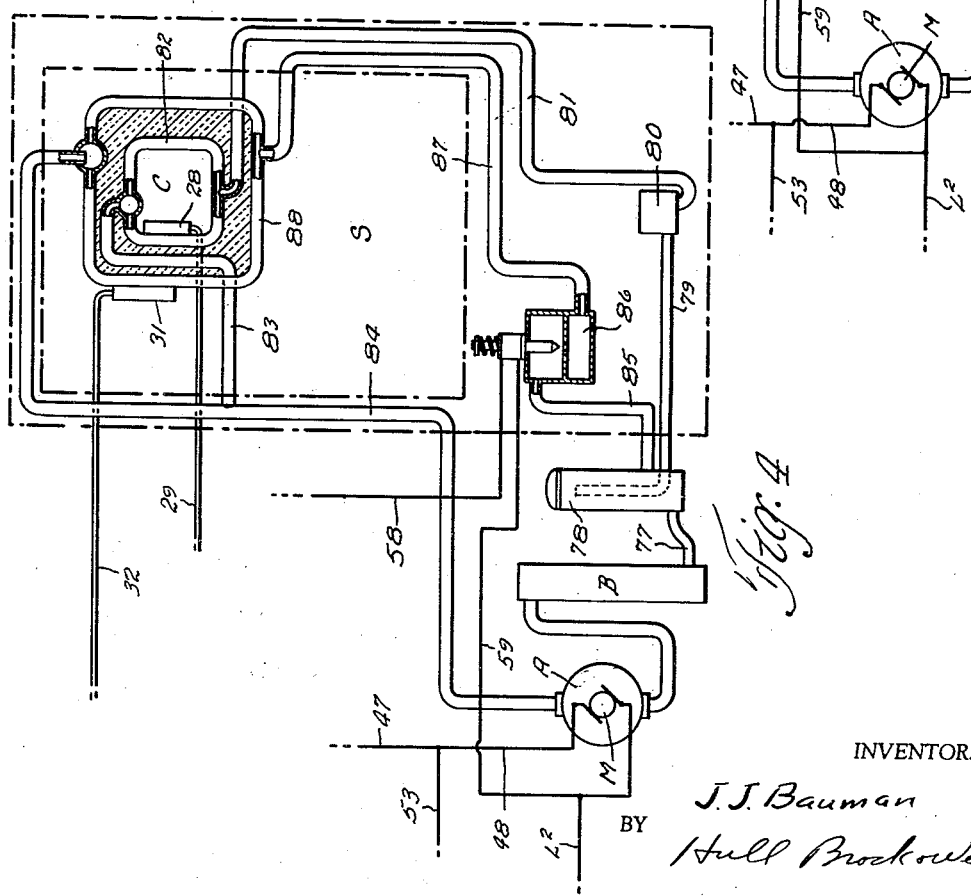
INVENTOR.
J. J. Bauman
BY Hull Brockowest
ATTORNEY.

Patented Sept. 5, 1939

2,171,517

UNITED STATES PATENT OFFICE 2,171,517

REFRIGERATING APPARATUS

John J. Bauman, Columbus, Ohio

Application April 30, 1937, Serial No. 140,000

8 Claims. (Cl. 62—4)

This invention relates to a refrigerating system wherein separate controls are provided for storage and freezing spaces or compartments and has for its principal object to provide an effective mechanism for controlling the temperature of these compartments, operating to provide cooling in the storage compartment when the temperature therein is above a desired maximum temperature, such, for example, as the temperature above which it is unsafe to maintain food in storage, and, when the temperature in the storage space is below such predetermined maximum, to preferentially cool the freezing space or compartment at the expense of the storage compartment until an optimum temperature has been reached in the freezing space or compartment, and, then, again operating to provide cooling for the storage compartment, lowering its temperature from a predetermined maximum to a predetermined optimum.

A further object is to render the attainment of the said principal object practical by the provision of control mechanism peculiarly adapted for its purposes and which may comprise an element which is movable responsive to temperature changes in the said compartments or to physical or other changes which are functions of temperature changes, and the provision of switch mechanisms interrelated with such thermally responsive movable mechanism to provide for the operation of such switch mechanisms. By the expression "responsive to temperature changes in said compartments", wherever used herein, it is not intended to imply that the thermally responsive mechanism is responsive solely to the temperature of the atmosphere in the compartments but that such mechanism is affected thereby. It may be affected to some extent also by coil temperature. Thus, the word "responsive" is used in an inclusive and not in an exclusive sense.

Figure 1:
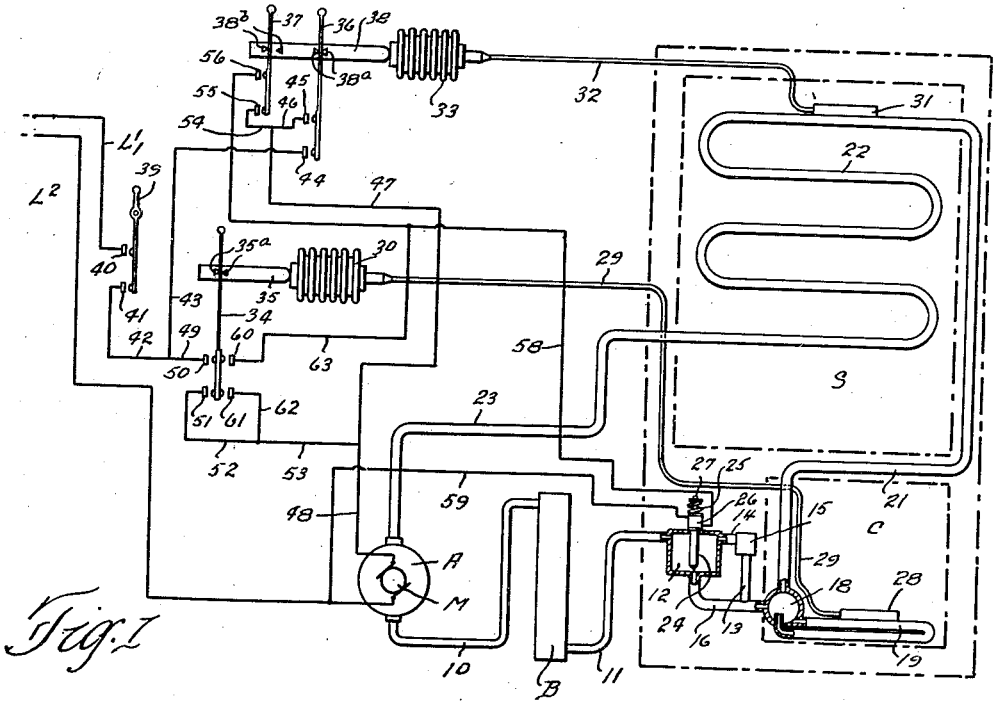
Figure 2:
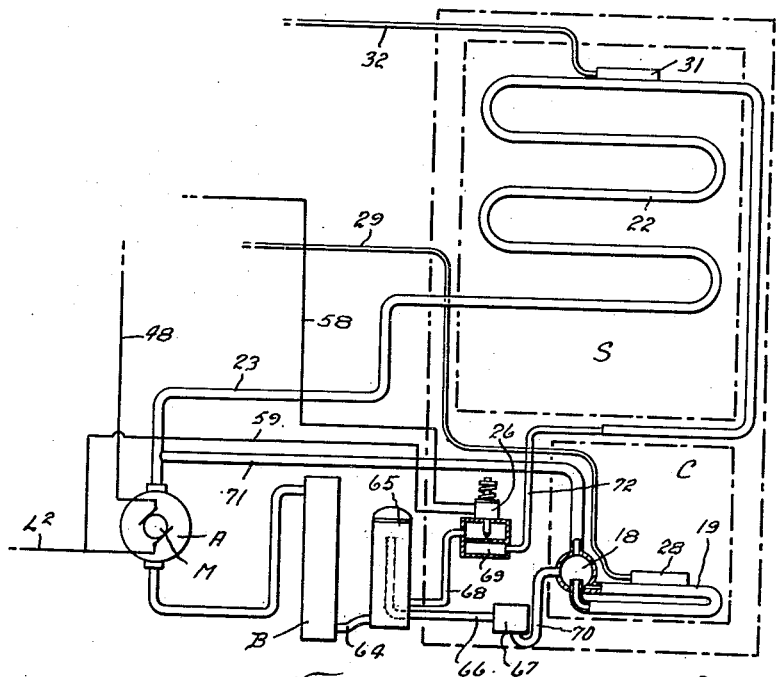

With the foregoing and other objects in view, the invention consists in the novel features of construction and arrangements of parts as will be apparent from the following description when read in connection with the accompanying drawings wherein Fig. 1 is a schematic showing indicating one arrangement of compartments, construction of refrigerant circulating mechanism and the relation thereto of thermally responsive elements and electric circuits; Fig. 2 is a fragmentary view showing parallel refrigerant circuits, it being understood that those portions of the thermostatic control elements, electric circuits and switches which are broken away are identical with those shown in Fig. 1; Fig. 3 is a similar fragmentary view of a modified construction embodying a series refrigerant circuit wherein the freezing chamber is defined by heat insulating walls positioned within the storage compartment; and Fig. 4 is a similar fragmentary view wherein the freezing compartment is positioned in the same manner as in Fig. 3 but where the refrigerant circuit is a parallel one.

This invention is herein shown and described as being embodied in a refrigerator which is provided with two compartments, insulated from each other, one of which is to be operated at a low temperature for the purpose of freezing ice (or other substances) while the other is to be operated at a relatively higher temperature, although below room temperature for the purpose of preserving food stored therein. In the drawings, the ice freezing compartment is indicated by the reference character C while the food storage compartment is indicated by the reference character S, the walls being indicated in dotted outline and it being understood that the spaces between the dotted outline are filled with suitable insulating material.

Referring first to the embodiment of Fig. 1, cooling is accomplished by circulating a refrigerant through suitable passages, the same taking the form of a substance which may be forced by compressor A through a pipe 10 into a condenser B where it is condensed to liquid form and delivered through a pipe 11 into a magnetic valve chamber 12 which forms a reservoir of the liquid refrigerant. From the reservoir 12 the refrigerant flows through the pipe 14 to a chamber 15 containing a float valve and thence through the pipe 13 to the bulb or header 18. The float valve opens when there is sufficient liquid in the chamber 15 to raise the float. From the header 18 the liquid may enter and evaporate in the heat absorbing, refrigerant conducting coil 19. The coil 19 preferably has all its convolutions in the same horizontal plane and may pass back and forth a plurality of times before it reenters the bulb or header 18, but is for convenience shown as comprising one convolution having its parts vertically aligned. From header 18, the refrigerant may pass upwardly through a pipe 21 to the food storage compartment cooling coil 22 (also termed herein a heat absorbing, refrigerant conducting element) and return through pipe 23 to the compressor A. The requirements and capacity of the system will be such that liquid refrigerant supplied through the float valve 15 will not raise the level above a predetermined height, too low to have the full refrigerating effect on the storage compartment. However, an additional valve 24, normally closed by a spring 25 and opened by an electromagnetic coil 26 operating upon a plunger 27, is provided for discharging the contents of the chamber 12 through pipe 16 to the header 18, also bypassing the float valve whereby to supply a greater quantity of liquid refrigerant. Upon the opening of the valve 24, liquid refrigerant will rise higher in the system and enhance the rate of cooling by the coil 22.

It will thus be seen that when the magnetic valve 24 is closed, the freezing compartment will be preferred over the storage compartment and that when the magnetic valve 24 is open, both the storage compartment and the freezing compartment cooling elements receive liquid refrigerant.

Mounted on the cooling element 19 or at any suitable point in the compartment C, is a bulb 28 forming a part of a temperature responsive element of the type which contains an expansible fluid, preferably a saturated vapor, in order to increase the amount of expansion for a given change in temperature. The interior of the bulb 28 is connected in communication, through a tube 29, with an expansible bellows 30. A similar bulb 31, mounted on the cooling element 22 or at any suitable point within the compartment S, communicates through a tube 32 with the interior of a similar expansible bellows 33. The bellows 30 actuates a movable switch element 34 through the medium of an actuator 35 while the bellows 33 actuates movable switch elements 36 and 37 through an actuator 38. The actuator 38 and the movable switch elements 36 and 37 are so constructed that when the temperature is above a predetermined maximum, the switch element 37 will be moved to make contact while the switch element 36 may be opened and closed at a considerably lower temperature. In the present construction, the point at which the switch element 37 makes contact will represent the predetermined maximum permissible temperature in the storage compartment S, while the switch element 36 will be opened and closed within a narrow temperature range corresponding to the desired optimum temperature in the compartment S.

Inasmuch as the particular construction of the electrical control mechanism is completely shown and claimed in my application Serial No. 48,548, filed November 6, 1935, of which application the present is a continuation in part, now Patent No. 2,084,424, I show in the present application a schematic representation of these controls. The schematic representation is such that it represents a construction which could be built as shown and if so built would be operative to secure the principal advantages of the control mechanism of the parent application although it would be deficient in respect to some of the smaller advantages. It should be stated in this connection that the switch arms 34, 36 and 37 are rigidly anchored at their upper ends and that they are of resilient construction and that the operating elements 35 and 38 carry knife edges 35ª and 38ª and 38ᵇ, respectively, arranged in pairs and engaging the switch arms 34, 36 and 37, respectively. The knife edges 35ª and 38ª are positioned adjacent the switch arms whereas the two knife edges 38ᵇ are spaced a considerable distance apart whereby the actuating element 38 may move from the position shown in Fig. 1 a material distance to the left before the right hand knife edge 38ᵇ engages the switch arm 37. Thus, by a small back and forth motion of the element 38 in one region of its motion the circuit across the switch points 44 and 45 may be made and broken and by a similar small back and forth motion at another point the circuit through the switch points 55 and 56 may be made and broken. From the foregoing and the detail description of the circuits to follow it will be clear that when the storage compartment S is at a high temperature so that the right hand knife edge 38ᵇ is in engagement with the switch arm 37 a small variation in temperature will result in alternately making and breaking the circuit through the switch points 55 and 56 whereas when the temperature of the compartment S is at a lower temperature a similar small variation will result in making and breaking the circuit through switch points 44 and 45. Thus, while I prefer to employ in actual practice the switch construction shown in detail in the parent application, it will be clear that there is disclosed in Fig. 1 a simpler control which although less desirable may be actually constructed and used and the disclosure of Fig. 1 is complete without reference to the disclosure of the parent application.

Assuming that both the storage compartment and the freezing compartment are at room temperature and it is desired to start the device, (still referring to Fig. 1) the manual switch 39 is closed. The temperature conditions will be such that the switch elements 34, 36 and 37 will be toward the left against the contacts. Motor circuit will be completed from L' through switch contacts 40 and 41 and conductors 42 and 43, through switch contacts 44 and 45 and conductors 46, 47 and 48 to the motor M and back to L²; a parallel motor circuit will exist from L' to switch contacts 40 and 41, conductor 49, switch contacts 50 and 51, conductors 52, 53 and 48 to the motor and then to L². It will thus be seen that a motor circuit is established by motion of switch element 36 to the left and an independent motor circuit is established by motion of switch element 34 to the left. At the same time a circuit for the magnetic valve 24 is made from L' through switch points 40 and 41, conductors 42 and 43, switch points 44 and 45, conductors 46 and 54, switch points 55 and 56, conductors 57 and 58 to the winding 26 which controls the magnetic valve 24 and thence through conductor 59 to L².

Responsive to this condition, the motor M will drive the compressor A and, since the magnetic valve will be open the header 18 will be filled with liquid refrigerant which will rise in the pipe 21 and pass to the cooling element 22 for the compartment S whereby both compartments are supplied with refrigerant until the temperature of compartment S shall have been reduced sufficiently to permit the expansible element 33 to contract and the actuator 38 moved to the right far enough to break the circuit through the switch points 55 and 56. As soon as this circuit has been broken the spring 25 will cause the magnetic valve 24 to close whereupon the liquid refrigerant will cease to rise in pipe 21 to coil 22 and the freezing compartment will be preferred over the storage compartment. This condition will then prevail (unless the temperature in compartment S rises above a safe maximum) until such time as the compartment C has been reduced to a predetermined optimum temperature after which the bellows 30 will cause the actuator 35 to move the switch element 34 toward the right so as to break the circuit through the switch points 50 and 51 and to make a circuit through switch points 60 and 61. The motor circuit through the switch points 50 and 51, described above, will now be broken but the motor circuit through switch points 44 and 45 will still be complete so that the compressor will run. At the same time the magnetic valve will be opened by means of a circuit established from L' through switch points 40 and 41, conductors 42 and 43, switch points 44 and 45, conductors 46, 47, 53 and 62, through switch points 61 and 60 and through conductors 63 and 58 to the coil 26 thence through conductor 59 to L². The magnetic valve being open the refrigerant will rise in pipe 21 to coil 22 and this condition will prevail until the temperature in the compartment S has been reduced to a predetermined optimum after which the element 33 will operate to move the switch element 36 to the right whereby to break the compressor motor circuit and stop the compressor unless the freezing compartment should demand refrigeration, which would cause movable element 30 to move actuator 35 to the left opening contacts 60 and 61 and closing contacts 50 and 51.

It will thus be seen that when the storage compartment is above a maximum for safe preservation of food, liquid refrigerant will be supplied to coil 22 through the magnetic valve until its temperature shall have been reduced below such maximum after which the ice freezing compartment will be preferred until its temperature has been reduced to the optimum. The food storage compartment will then receive refrigerant again until its temperature has been reduced to the optimum. When both compartments are at the predetermined optimum the compressor is stopped and the magnetic valve 24 is closed.

Referring now to Fig. 2 and using the same reference numerals as to structure which remains unchanged, the cycle of operation will be as follows: With coils 22 and 19 at room temperature contacts 50—51 also 55—56 and 44—45 are closed. When contacts 40 and 41 are closed the compressor operates taking in vapor on its suction side from the system, throughout which the refrigerant is distributed. The compressed vapor is condensed to a liquid in condenser B and delivered to receiver 65. Since contacts 55 and 56 are closed the magnetic valve is open and liquid refrigerant flows to coil 22, during this period it is unlikely that the liquid level in 65 will rise above the mouth of tube 66. When coil 22 drops below a predetermined maximum temperature contacts 55 and 56 open and the magnetic valve 26 closes. With continued operation the liquid level rises in receiver 65 till the mouth of tube 66 is covered thereby admitting liquid to the float chamber 67 to open the float valve and admit refrigerant to coil 19. When coil 19 has reached a predetermined optimum temperature contacts 50 and 51 open and contacts 60 and 61 close to again open the magnetic valve. Liquid now flows both through the magnetic valve to coil 22 and through the float valve chamber 67 so long as the liquid level in receiver 65 covers the mouth of tube 66. When the liquid level drops below the mouth of the tube 66 liquid ceases to enter coil 19. This will occur shortly after the magnetic valve opens which causes a flow from 65 to sufficiently lower the liquid level in 65 below the mouth of tube 66. When coil 22 has reached its optimum temperature, contacts 44 and 45 open, closing the magnetic valve and stopping the compressor. Thus it will be seen that the load on the compressor is virtually only one coil at a time permitting a smaller compressor to be used and effecting operating economies. It is understood that the same variations from the straightforward method of operation traced above exists in the parallel system as in the series system. As is true in the series system the refrigerant charge for the parallel system must also be carefully measured.

The rate of flow of refrigerant to coils 19 and 22 is a function of size of the passages through which it must pass such as the orifice leading from the float valve or the orifice from the magnetic valve. The rate of expansion of the liquid is a function of the coil temperatures, however, the liquid will flow into the coils at a rate governed only by the restrictions in the circuit and dependent on the temperature in the coils only so far as the temperatures affect head and suction pressures. Thus the physical dimensions of the refrigerant circuit determine the rate of flow into coils 19 and 22 and the temperatures therein at any given suction pressure determines the rate of expansion or rate at which the vaporous form of refrigerant can leave the coils.

Referring now to Fig. 3 it will be seen that the arrangement of the magnetic valve chamber 12 and float valve chamber 15 is identical with Fig. 1 and that the conduit 16 passes upwardly and connects with the refrigerating coil 73 at the bottom thereof. From the top of the coil 73 the refrigerant passes through a conduit 74 embedded in the insulating walls of the freezing compartment C to the lower portion of the refrigerating coil 75 on the outside of the freezing compartment. From the top of the coil 75 the refrigerant passes through a conduit 76 to the compressor A. As will be obvious from the drawings the construction of Fig. 3 is, with the exception of the location and arrangement of the freezing compartment and coils, substantially identical with the construction of Fig. 1. The coaction of the various parts of the cooling circuit is hereby substantially the same as in the construction of Fig. 1.

Referring now to Fig. 4 it will be seen that refrigerant passes from the condenser B through a conduit 77 to the receiver 78 and thence through the pipe 79 to the float valve chamber 80. From the chamber 80 it passes through conduit 81 to the refrigerating coil 82 at the bottom thereof and from the top thereof through a conduit 83 to the return pipe 84 which communicates with the compressor A. Through a branch 85 of the conduit 79 refrigerant passes to the magnetic valve chamber 86 and thence through a conduit 87 to the refrigerating coil 88 at the bottom thereof. From the top of the coil 88 the refrigerant passes through the conduit 84 to the compressor A. It will be clear from the foregoing and Fig. 4 of the drawings that the position of the freezing compartment C and the relation thereto of the refrigerating coils is the same as in the construction of Fig. 3 differing therefrom in that the refrigerant circulates through parallel circuits to and from the two refrigerating coils and is controlled in the same manner as shown in Fig. 2. The construction of Fig. 4 is related to that of Fig. 2 in the same way that the construction of Fig. 3 is related to that of Fig. 1.

While I have shown and described the preferred embodiment of my invention I wish it understood that I am not limited to the details shown and described but only in accordance with the appended claims and the prior art.

Having thus described my invention, what I claim is:

1. In a refrigerator having storage and freezing spaces, a storage compartment thermostat responsive to the temperature in said storage space, a freezing compartment thermostat responsive to the temperature in said freezing space, means for circulating a refrigerant in cooling relation to said spaces, selector means for causing said refrigerant to exercise its cooling effect upon one or both of said spaces, and means responsive to said thermostats for controlling said circulating means and said selector means to cool said storage space when the temperature thereof is above a predetermined maximum, irrespective of the temperature in the freezing space, and when the temperature of said storage space is below such maximum, preferentially cooling said freezing space until the temperature thereof has been reduced to a predetermined temperature.

2. In a refrigerator having storage and freezing spaces, a storage compartment thermostat responsive to the temperature in said storage space, a freezing compartment thermostat responsive to the temperature in said freezing space, means for circulating a refrigerant in cooling relation to said spaces, selector means for causing said refrigerant to exercise its cooling effect upon one or both of said spaces, means responsive to said storage compartment thermostat for actuating said selector to cool said storage space, irrespective of the temperature in said freezing space, to a predetermined upper limit responsive to a temperature above such temperature, limit therein irrespective of the temperature in said freezing space and means responsive to said freezing compartment thermostat for actuating said selector to cool said storage space to a temperature below such upper limit responsive to existence of a predetermined low temperature in the freezing space.

3. In a refrigerator having thermally separate storage and freezing spaces, a storage compartment thermostat responsive to the temperature in said storage space, a freezing compartment thermostat responsive to the temperature in said freezing space, means for circulating a refrigerant in cooling relation to said spaces, selector means for causing said refrigerant to exercise its cooling effect upon one or both of said spaces, means responsive to said storage compartment thermostat and independent of said freezing compartment thermostat for causing said circulating means to operate, means responsive to said freezing compartment thermostat and independent of said storage compartment thermostat for causing said circulating means to operate, means responsive to a predetermined condition of said storage compartment thermostat for causing said circulating means to cool said storage space and means responsive to said freezing compartment thermostat and dependent upon the condition of said storage compartment thermostat for preferentially cooling said freezing space.

4. In a refrigerator having storage and freezing compartments separated by thermal insulation, a heat absorbing refrigerant conducting element associated with each of said compartments and adapted to cool the same, refrigerant circulating means connected in communication with and adapted to supply refrigerant to said heat absorbing elements, valve means adapted to vary the relative cooling effect of said heat absorbing elements on their respective compartments and control means responsive to the temperature in said compartments for operating said circulating means and said valve means to cause maximum cooling in said storage compartment when the temperature therein is above a predetermined maximum and to cause a greater cooling in said freezing compartment and less in said storage compartment when the latter is between said maximum and a predetermined optimum temperature and the former is above a predetermined optimum.

5. In a refrigerator having a storage compartment and a freezing compartment within and insulated from the storage compartment, a heat absorbing refrigerant conducting element associated with each of said compartments and adapted to cool the same, refrigerant circulating means connected in communication with and adapted to supply refrigerant to said heat absorbing elements, valve means adapted to vary the relative cooling effect of said heat absorbing elements on their respective compartments and control means responsive to the temperature in said compartments for operating said circulating means and said valve means to cause maximum cooling in said storage compartment when the temperature therein is above a predetermined maximum and to cause a greater cooling in said freezing compartment and less in said storage compartment when the latter is between said maximum and a predetermined optimum temperature and the former is above a predetermined optimum.

6. A refrigerator construction according to claim 5 wherein the heat absorbing refrigerant conducting means for the storage compartment forms a part of the return passage for refrigerant from the heat absorbing refrigerant conducting means for the freezing compartment.

7. A refrigerator construction according to claim 5 wherein an independent return passage is provided for each heat absorbing refrigerant conducting elements.

8. In a refrigerator having thermally separate storage and freezing spaces, a storage compartment thermostat responsive to the temperature in said storage space, a freezing compartment thermostat responsive to the temperature in said freezing space, a plurality of switch operating means, one thereof being responsive to each of said thermostats, switches operated by said switch operating means, one of said switch operating means being associated with a plurality of switches, means connecting said last mentioned switch operating means with said last mentioned switches for operation of one of said switches by a small back and forth motion in one region of the movement of said last mentioned switch operating means and for operation of another of said switches by a small back and forth motion in another region of its motion, and refrigerant circulating means controlled by said switches.

JOHN J. BAUMAN.